UNITED STATES PATENT OFFICE.

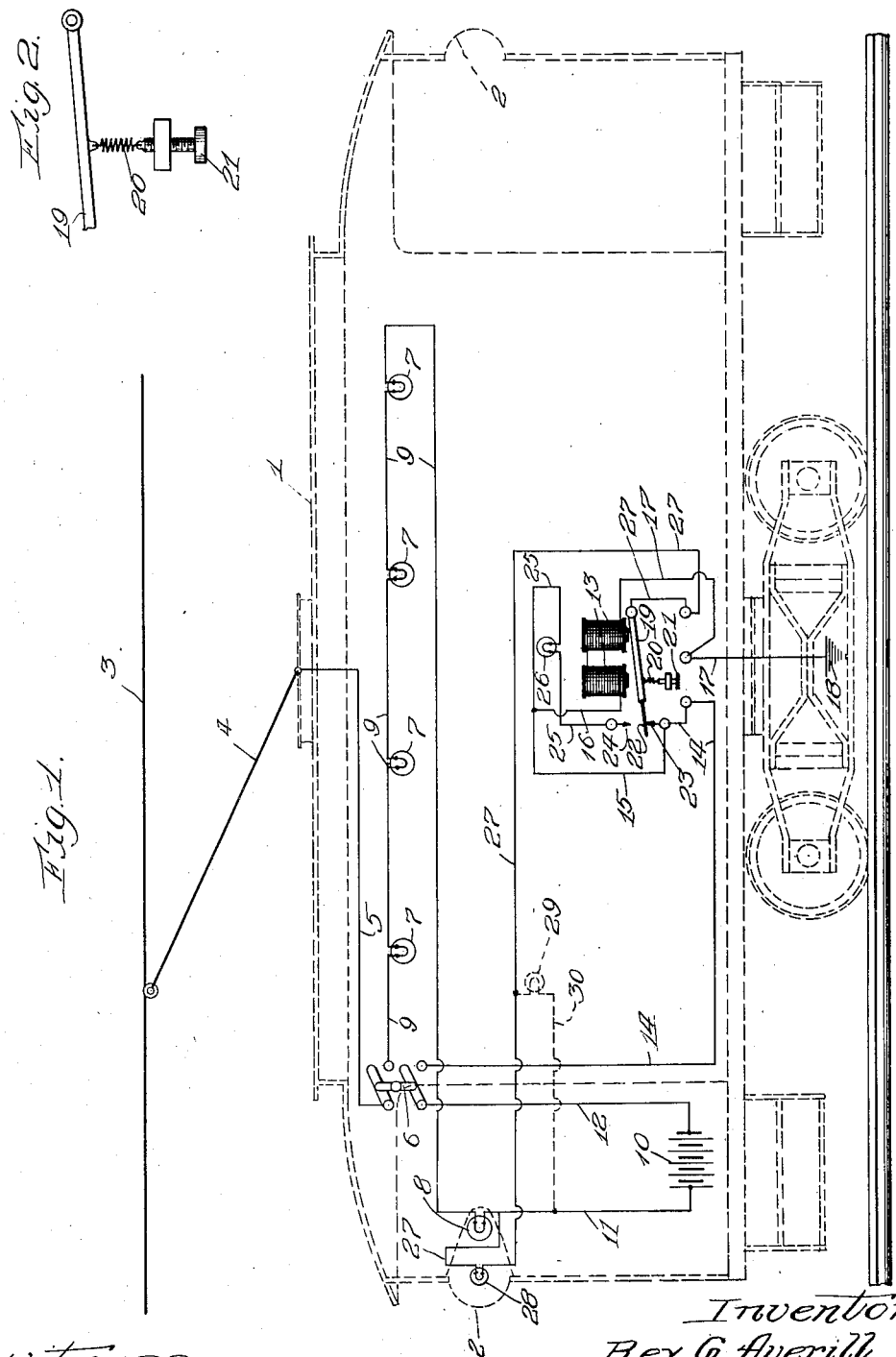

REX G. AVERILL, OF MANSFIELD, OHIO, ASSIGNOR TO THE OHIO BRASS COMPANY, OF MANSFIELD, OHIO, A CORPORATION OF NEW JERSEY.

CAR SIGNAL SYSTEM.

1,284,977.  Specification of Letters Patent.  Patented Nov. 19, 1918.

Application filed April 10, 1916. Serial No. 90,072.

*To all whom it may concern:*

Be it known that I, REX G. AVERILL, a citizen of the United States, residing at Mansfield, in the county of Richland and State of Ohio, have invented certain new and useful Improvements in Car Signal Systems, of which the following is a specification.

This invention relates to a signal system for trolley cars and the like to provide means for protecting cars from collisions at night in case a car may be disabled and left in darkness due to the fact that the current from the normal supply is cut off.

Among the objects of the invention are to provide an auxiliary signal lighting system which is automatically thrown into service in case the voltage from the supply should drop so low that the main lighting circuits are of low brilliancy; to automatically place in operation an auxiliary signal lighting system when the main and normal current supply fails; to provide means for charging a storage battery for supplying current to the auxiliary signal and lighting system during the normal operation of the car; to provide a visual signal which indicates that the battery circuit is broken; and to provide means for eliminating destructive arcing at relay contact points when an armature is shifted under certain conditions.

The invention consists in the novel construction, combination and arrangement of parts.

In the accompanying drawing, Figure 1 is a diagrammatic view of a car signal system applied to a trolley car, shown in broken outline, and Fig. 2 is a detail view showing means for regulating the tension on a magnet armature.

In the normal operation of an electric car a signal lamp is provided which is energized from the main supply system but if the voltage becomes too low or if the normal supply entirely fails it is desirable to have a signal lamp which will thereupon be energized automatically, taking the place of the other signal lamp. The present invention relates to an automatic signal system which receives current from a storage battery energized from the main source of current supply under normal conditions but automatically placed in operation when the normal current supply fails.

In the accompanying drawing a trolley car is shown in broken outline and designated generally by the reference numeral 1. It is provided at one or both ends with projections 2 which represent bull's-eyes or globes for a car signal system. The trolley car receives current from a trolley wire 3 through a trolley pole 4 and its signal system receives current from the trolley pole and the source of supply through a conductor 5 which is connected to one of the terminals of a two-pole switch 6. In the car are a plurality of lamps 7 connected in series with each other and with another signal lamp 8 disposed behind the bull's-eye 2, by conductors 9. A storage battery 10 is connected at one end by means of a conductor 11 with one terminal of the signal lamp 8 and at the other end by a conductor 12 with one of the terminals of the double pole switch 6. An electromagnet 13 is connected by conductors 14, 15 and 16, with the corresponding battery pole of the switch 6 and by conductors 17 to a ground 18. This electro-magnet 13 has a pivoted armature 19 which is normally drawn by a spring 20 having an adjusting screw 21 for varying the tension of the spring. This armature carries a contact 22 at its free end which engages either of the fixed contacts 23 and 24, the former being connected to the conductor 14 and the contact 24 being connected through conductors 25 and a resistance 26 to the conductor 16. This resistance 26 is preferably a visual signal, such as a lamp, it being found that a lamp of about the same resistance as the lamps 7 and 8 being suitable for the purpose.

The free end of the armature or the contact 22 thereof engages either of the contacts 23 or 24 and the other end of the armature which is also a conductor is connected by means of contacts 27 through an auxiliary signal lamp 28 to the conductor 11 at one side of the battery 10.

One or a plurality of other signal lamps 29 may be connected by conductors 30 to the conductors 27 and 11 which are connected to the opposite ends of the battery 10 when the auxiliary car lighting system is in operation. This lamp or lamps 29 may supplement the rear signal lamp 28 or may be used to light the entire car when the ordinary source of supply is broken.

It should be understood that the lamps 8 and 28, as shown, are both rear signal lamps visible through the bull's-eye 2 when lighted; the lamp 8 is lighted under normal operating conditions and the lamp 28 is the auxiliary lamp which is lighted automatically in emergencies when the main lighting or power system fails. The lamp 26 is a visual signal for indicating that the battery connections are impaired, as will be hereafter explained.

In the normal lighting of the car and the signal lamp current flows from the trolley wire 3 through the pole 4, conductor 5, switch 6, and through the lamps 7 and 8, connected in series by the conductor 9, thence through conductor 11, battery 10, conductor 12, switch 6, conductors 14, 15 and 16, magnet 13 and through conductors 17 to ground 18. This will light the lamps 7 and 8, charge the battery 10 and energize the magnet 13. As soon as the magnet is energized the armature 19 is drawn up moving the contact 22 from engagement with the contact 23 into engagement with the contact 24, against the tension of the armature spring 20. This completes a circuit from the conductor 15 which is connected through the conductors 14, 12 and switch 6 with one side of the battery 10 through the conductors 25, lamp resistance 26, contact 22, armature 19, conductors 27 and through the lamp 28 to the other side of the battery 10 through the wire 11. That is, the lamp 28 which is a low voltage lamp is connected in series with the lamp 26 which is of comparatively high resistance across the terminals of the battery 10. Under this condition sufficient current will not flow through the lamp 28 to light it.

Should the terminals of the battery become disconnected or impaired for any reason, the lamps 7 and 8 will be lighted by being connected in series through the lamps 26 and 28. The circuit may then be traced as follows: from the source of supply through the switch 6, lamps 7 and 8, as before, but not through the battery 10, the current following the conductors 27 through low voltage lamp 28 to the armature 19. If the armature is down the current will flow through the contact 23, conductors 15 and 16, through magnet 13 and conductors 17 to ground 18. This will immediately energize the magnet 13, as before, drawing up the armature 19 and causing the circuit to be continued, not through the contact 23 but through contact 24, conductors 25 and lamp 26 to the contact 16, and thence through the magnet 13 to ground. At the instant the armature contact 22 passes from the contact 23 to the contact 24 a destructive arc would be set up were it not for the fact that the shunt including high resistance lamp 26 is interposed between the contacts 23 and 24 through the conductors 25 and 15. This eliminates any destructive arcing or sparking at the relay contact points when the armature contact 22 is shifted between them. This action places all of the lamps 7, 8, 28 and 26 in series and the applied voltage is sufficient to light the resistance lamp 26 which will indicate to the conductor or operator that something is wrong with the battery connections, which may then be attended to.

In case the normal current supply fails when the switch 6 is closed and the lamps 7 and 8 are lighted the lamps 7 and 8 will be extinguished and in such case the auxiliary lighting system automatically becomes operative and the current flows from the conductor 11 through the conductors 27, auxiliary signal lamp 28, armature 19, contacts 22 and 23, conductors 14, switch 6 and conductor 12 to the other side of the battery. The armature 19 would be drawn down against contact 23 as the armature is held normally out of connection with the contact 24 by means of the spring 20. It is obvious that by regulating the tension of the spring 20 by means of the thumb-screw 21 it is possible to cause the armature contact to be thrown out of connection with the contact 24 when the voltage on the supply drops to such a point that the main lines 7 and 8 become dim thereby throwing the battery for the auxiliary circuit into operation and substituting the signal lamp 28 for the other signal lamp 8.

The number of additional lamps 29 which are provided for the car depends, of course, upon the capacity of the storage battery. They may be sufficient to illuminate the car, if desired.

I claim:

1. The combination with lighting and signal lamps, of a battery and an auxiliary signal lamp normally connected together in multiple and in series with the other lamps, and a normal source of current supply with means including an electro-magnetic switch, whereby the auxiliary signal lamp automatically becomes operative when the normal source of current fails.

2. The combination with lighting and signal lamps, of a normal source of current supply therefor, an auxiliary signal lamp normally unlighted but in circuit with the other lamps, an electro-magnetic switch normally energized by said current supply, and an auxiliary source of current supply for the signal lamp which automatically becomes operative through the switch when the normal source fails.

3. The combination with lamps connected in series, one or more of which are signal lamps, of an auxiliary source of current supply and an auxiliary signal lamp connected in multiple and in circuit with the other lamps, and means for closing a circuit through the auxiliary signal lamp from the auxiliary source of current supply when the current supply fails for the lamps connected in series.

4. In a car signal system, the combination with a battery and auxiliary signal light, of means for connecting them in a local circuit, and a plurality of lighting and signal lamps connected in series and through the battery and said auxiliary signal lamp in multiple to ground in the normal operation, and a normal source of current supply for the system.

5. In a lighting and signal system for trolley cars, the combination with a battery and an auxiliary signal lamp and means for connecting them in a local circuit, of a plurality of lamps connected in series and through the battery and said auxiliary signal lamp in multiple to ground when the normal voltage is applied to the system, the auxiliary lamp being automatically lighted by current from the battery when the normal source of current is insufficient to light the lamps connected in series.

6. In a lighting system of the class described, the combination with a normal source of current supply, of lighting and signal lamps connected in series, a battery, an electro-magnetic switch energized by said current supply, and an auxiliary signal lamp connected in multiple with the battery and with the multiple connection in series with the other lamps when receiving current from the normal source of current supply and in a local circuit with the battery through the switch and the lamp when the normal source of current supply fails.

7. In a car lighting system comprising a normal source of current supply, a plurality of lighting and signal lamps connected in series and a grounded return, the combination of a battery, an electro-responsive switch energized by the normal supply of current, and an auxiliary signal lamp connected in parallel and receiving current, together in series with said other lamps from the source of current supply therethrough to ground, the said parallel connection of the battery and lamp being in a local circuit made by the switch for lighting the lamp when the normal source of current supply fails.

8. In a lighting system of the class described, the combination with a normal source of current supply, of series connected lighting and signal lamps, a battery and an auxiliary signal lamp connected in parallel and receiving current in series with the other lamps from the said normal source, and means including an electro-magnetic switch dependent upon the supply of current from the normal source of current supply for reducing the current through the said signal lamp to prevent it from lighting.

9. In a system of the class described, the combination with a source of current supply, of an electro-responsive device energized by current from the normal source of supply, an auxiliary signal lamp and a battery normally connected together in multiple and in series with said device, and means in connection with the electro-responsive device for closing a local circuit from the battery through the said signal lamp when the ordinary source of current supply is insufficient to operate the electro-responsive device.

10. In a lighting system of the class described, the combination with a battery and an auxiliary signal lamp normally connected in multiple, of a normal source of current supply connected to the battery and said lamp, an electro-responsive in series with said multiple connection through which the normal current flows, and a resistance controlled by the electro-responsive device and thrown in circuit thereby with the signal lamp for extinguishing it when the normal current is flowing in the said electro-responsive device.

11. In a signal system, the combination with a normal source of current supply, of a battery and an auxiliary signal lamp normally connected in parallel and receiving current from the normal current supply, an electro-responsive device to receive the total current passing through the battery and said auxiliary signal lamp, a resistance lamp, and a contact maker controlled by the said device for closing a circuit from the auxiliary signal lamp causing the resistance lamp to be lighted when the current path through the battery is broken.

12. In a system of the class described, the combination with a normal source of current supply, of a battery and an auxiliary signal lamp for carrying the current in parallel, thereby normally charging the battery, an electro-magnet also energized by the total current in the circuit, a movable armature controlled by the magnet, a contact carried by the armature and corresponding contacts with which it coöperates, a resistance and circuit connections from the armature contact and from the resistance to include the resistance in circuit with the signal lamp for reducing the current in the signal lamp when the armature is attracted by the magnet.

13. In a system of the class described, the combination with an ordinary or normal source of current supply, a battery, an auxiliary signal lamp, a resistance, an electro-magnet having an armature contact movable between fixed contacts, and connections whereby the electro-magnet receives the total current flowing from the source of current supply through the battery and signal lamp connected in parallel and thereupon operates the armature to close a circuit through the said resistance from the signal lamp to prevent the lighting of the signal lamp under ordinary conditions, the armature contact forming a local circuit through the signal lamp and battery when the normal current from the source of supply fails.

14. In a signal system of the class described, the combination with a normal source of current supply, of lighting and signal lamps connected in series, a storage battery, an auxiliary signal lamp, an electro-magnet having a movable armature, an adjustable spring for retracting the armature, and armature contact and fixed contact members between which it is oscillatable, a resistance lamp, a two-pole switch and circuit connections for normally connecting the battery and auxiliary signal lamp in parallel and in series with the electro-magnet and the other lamps connected in series, the said armature contact, when the armature is attracted by the magnet, closing a circuit through the auxiliary signal lamp and the resistance lamp reducing the current through the auxiliary signal lamp, the armature and its contact being operative to close a local circuit through the battery and the auxiliary signal lamp when the normal current flowing through the electro-magnet is insufficient or fails and being operative to light the resistance lamp when the normal current flows and the path through the battery is broken.

In testimony whereof I have signed my name to this specification, in the presence of two subscribing witnesses, on this 5th day of Apr. A. D. 1916.

REX G. AVERILL.

Witnesses:
C. V. MARKS,
RAYMOND KAISER.